United States Patent [19]
Bird et al.

[11] Patent Number: 5,555,686
[45] Date of Patent: Sep. 17, 1996

[54] POWERED UTILITY BOARD

[76] Inventors: James F. Bird, 609 Westway Dr., Walker, Mich. 49504; Douglas E. Huesdash, 9916 68th Ave., Allendale, Mich. 49401; Lawrencw E. Pierce, 2650 William Ave., Holland, Mich. 49424; Robert L. Shaw, 1099 S. 96th Ave., Zeeland, Mich. 49464

[21] Appl. No.: 331,991

[22] Filed: Oct. 31, 1994

Related U.S. Application Data

[62] Division of Ser. No. 893,665, Jun. 5, 1992, abandoned.
[51] Int. Cl.$^6$ ............................................. E04B 5/48
[52] U.S. Cl. .................................. 52/220.1; 174/49
[58] Field of Search .................... 52/220.1, 220.8; 174/48, 49; 439/215

[56] References Cited

U.S. PATENT DOCUMENTS 2,891,102  6/1959  Grimes .
3,909,912  10/1975  Kiesling .

*Primary Examiner*—Carl D. Friedman
*Assistant Examiner*—Creighton Smith
*Attorney, Agent, or Firm*—Robert L. McKellar

[57] ABSTRACT

What is disclosed in this specification are utility boards and utility boards and power modules in combination. The utility boards include such devices as tackboards, marker boards, or other detachable panels. The boards are decorative, have varied utility and have the capability of providing a power source at the desktop level while being highly portable.

5 Claims, 2 Drawing Sheets

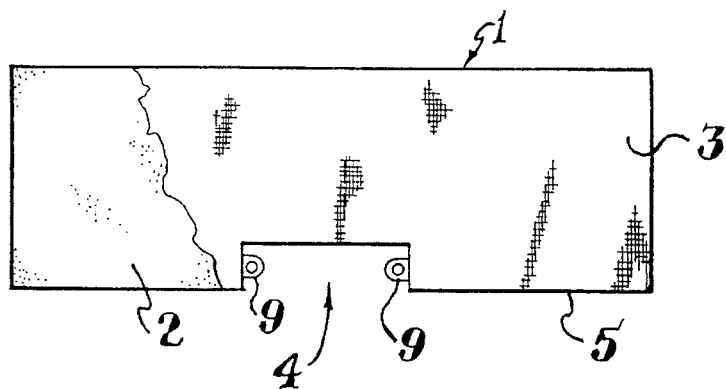
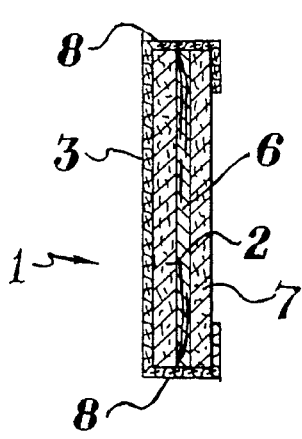
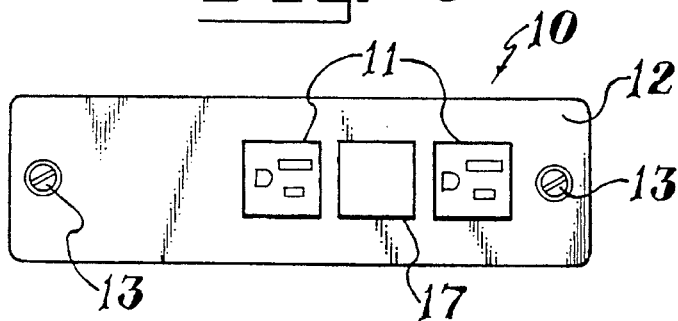
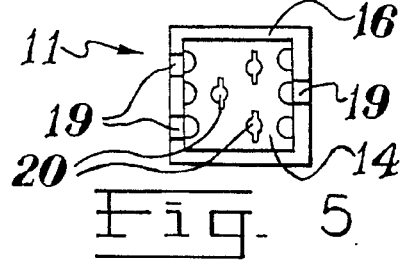
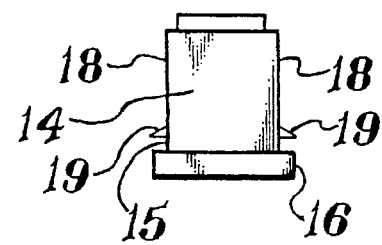
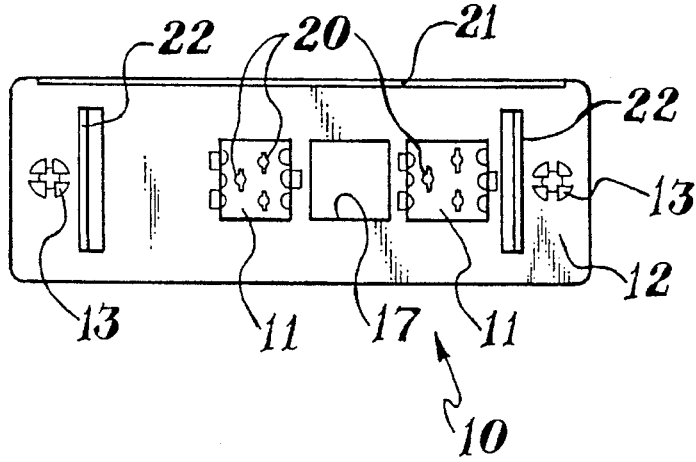
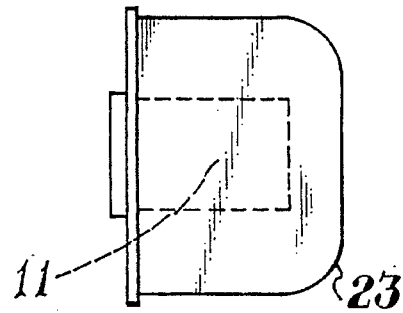

5,555,686

POWERED UTILITY BOARD

This application is a division of Ser. No. 893,665, filed Jun. 5, 1992, now abandoned.

This invention deals with novel utility boards and power modules and with a combination of the utility boards and power modules. Novel "utility boards" includes such concepts as tackboards, marker boards, or other detachable panels of the design and concept set forth herein for the utility boards.

More specifically, this invention deals with certain specific utility boards, that are decorative, have varied utility, and have the capability of providing a power source at the desktop level. Such utility is provided by a combination of the novel power modules of this invention used in conjunction with the novel utility boards of this invention.

FIELD OF THE INVENTION

The utility boards of this invention are new and novel utility boards which are decorative, have varied utility and allow the utilization of power at the desktop level. The panels are portable and are used preferably with free standing walls or dividers to enhance the decorative effect of any place where they are used, while providing a power source without the necessity of internally wiring or cabling the free standing walls and divider panels.

There are many types of wall panels and dividers to meet the various needs of offices and the like.

Typical of such walls and dividers can be found in U.S. Pat. No. 4,031,675 to Roberts, et al., issued Jun. 28, 1977, wherein there is disclosed free standing redecoratable vertical wall or divider panels.

These panels are movable and are capable of placement within any building complex to form cubicles or areas for different functional purposes in accordance with a desired floor plan. It should also be noted that these prior art dividers are structural and free standing while the utility boards of the instant invention are designed to be surface mounted on such dividers and the like.

These panels are hollow in the center and wiring, among other things, is hidden in the hollows in order to bring power to the area they are used in. However, none of the panels disclosed in this patent are panels that afford a utility board surface, because they are simply rectangular frames which have been covered with soft decorative materials, such as fabrics, which creates hollow panels, and further, they do not contain the novel power module of the instant invention.

In U.S. Pat. No. 4,882,885, to Chatterson et al, issued Nov. 28, 1989, there is disclosed a panel port retention system in which a space dividing panel having an interior rectangular framework provided with a covering on both sides has channels extending along either or both of the upper and lower edges for accommodating communication and electric cables. Ports to support communication cabling at the worksurface height is included, however, the porting is limited because it must be located along the perimeter of the panel in order to secure it into place against one of the supporting members of the panel. This arrangement differs from the instant invention because of the fact that the utility board of the instant invention can have the port placed anywhere in the board without restriction because the board of the instant invention is a solid member.

Finally, there is shown in U.S. Pat. No. 4,603,229, issued to Menchetti on Jul. 29, 1986, a utility module for walls. In fact, for the most part, Menchetti's panels are the walls.

Menchetti discloses a module which includes an upper and a lower plate assembly which extends between adjacent studs and is supported at the ends on the studs. This panel suffers from the same difficulties that the Chatterson panel does, in that it does not have unlimited ability to secure ports for communication any place on the panel except on one of the studs.

Thus, none of the prior art devices anticipates or makes obvious the instant invention.

BRIEF DESCRIPTION OF THE DRAWINGS

FIG. 1 is a front plan view of a utility board of this invention with the left hand corner of the board showing an uncovered portion.

FIG. 2 is an end view of the utility board of FIG. 1 with the utility cover missing from the end.

FIG. 3 is a front plan view of the power module of the instant invention.

FIG. 4 is a back view of one of the power receptacles useful in the power module.

FIG. 5 is a side view of the power receptcle of FIG. 4.

FIG. 6 is a back plan view of the power module of FIG. 3 without the back boxlike cover.

FIG. 7 is an end view of the power module of FIG. 3 showing a power receptacle in phantom.

THE INVENTION

Figure 8:
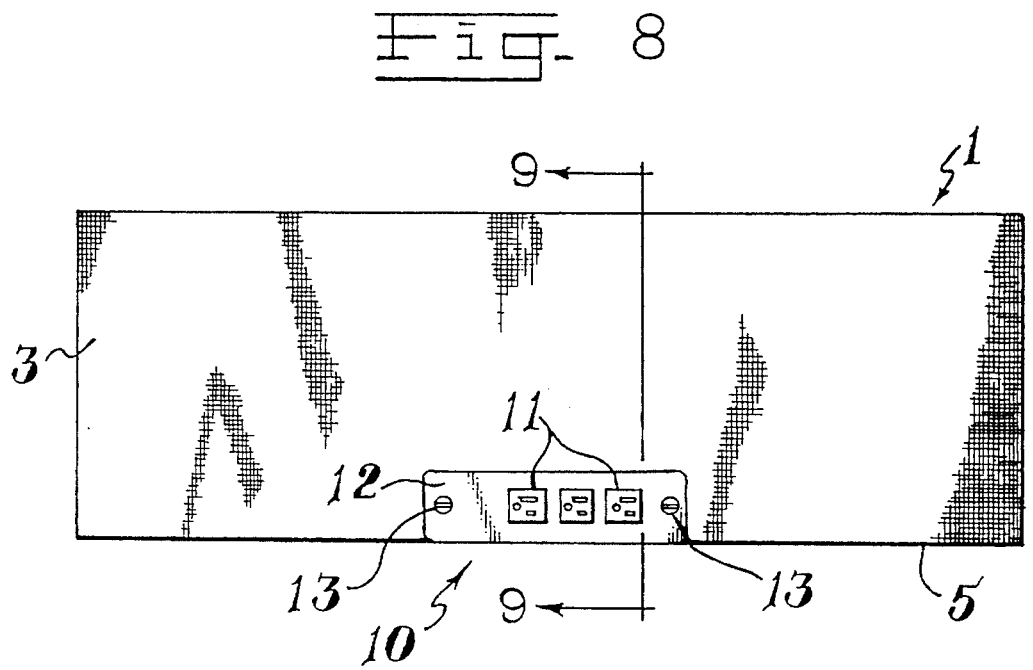
FIG. 8 is full frontal view of a utility board of this invention showing a power module located in the center, bottom edge.
Figure 9:
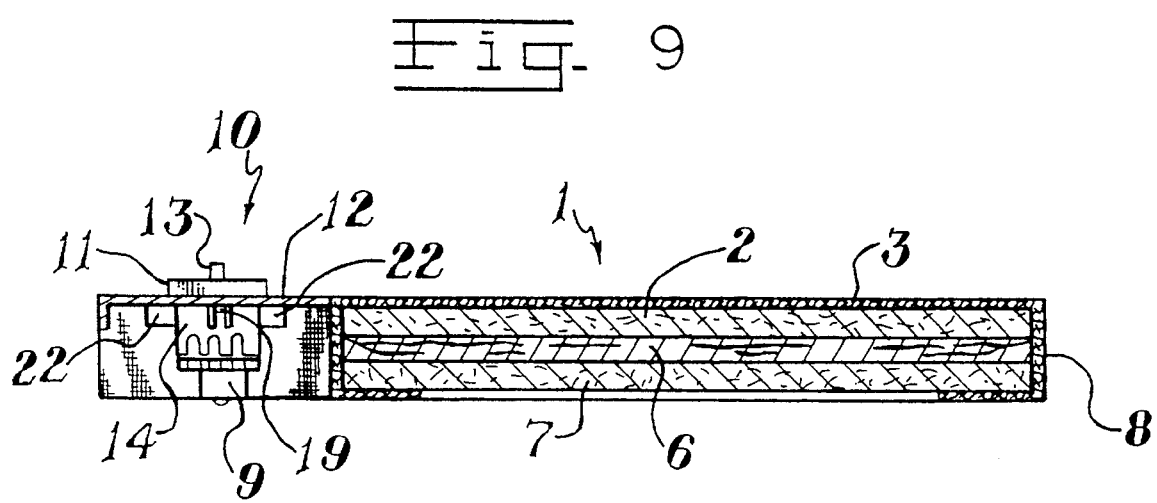
FIG. 9 is a cross sectional view of the utility boartd of FIG. 8, through the line 9—9 of FIG. 8 showing the composition of the utility board.

The instant invention deals with novel utility boards. The utility boards of this invention are new and novel utility boards which are decorative, have varied utility, and allow the utilization of power at the desktop level.

More specifically, the utility board of this invention comprises a single solid member having on at least one surface of said solid member a utility substrate and the uility substrate, when used as a tackboard may have on it a decorative covering.

The solid member and the decorative covering contain at least one aligned opening through them.

This invention also deals with a power module in combination with a utility board having a front surface and a back surface. The power module comprises a single flat member having a front planar surface and a back planar surface, an upper edge, and a lower edge and the back planar surface has on at least one of it's upper edge or lower edge, a lip directed towards the back planar surface such that a rail is formed on at least one edge of the back planar surface to adapt to, and align with a front surface outside edge of the utility board. It should be noted by those skilled in the art that the lip that is directed towards the back planar surface and which forms a rail on at least one edge of the back planar surface is not required if the unit is to be mounted on the utility board in other than an edge. In other words, for example, the lip is not required if the power unit is to be mounted in the center of the utility board. Therefore, another embodiment of the instant invention is a power module, wherein the power module comprises a single flat member having a front planar surface and a back planar surface, an upper edge, and a lower edge. The power module provides at least one fastening means and at least one power receptacle which may be readily removable from the power module, and readily replaceable in the power module. The power module has a boxlike covering which is attached to the back planar surface and which covers the fastening means and all power receptacles of the power module.

The power module provides at least one fastening means to fasten the power module to the utility board and, the power module provides at least one power receptacle which can be readily removable from the power module, and readily replaceable in the power module. The power module can be permanently attached to the utility board or it can be removable. The module is designed to provide among other accesses, access to electrical, data cable, and/or communications lines, and the like.

Finally, this invention deals with a combination which is a power module in combination with a utility board having a front surface and a back surface. The power module comprises a single flat member having a front planar surface and a back planar surface, an upper edge, and a lower edge and the back planar surface has on at least one of it's upper edge or lower edge, a lip, directed towards the back planar surface such that a rail is formed on at least one edge of the back planar surface to adapt to, and align with a front surface outside edge of the utility board.

The power module provides at least one fastening means to fasten the power module to the utility board and, the power module provides at least one power receptacle, data cable access or communications line, which is readily removable from the power module, and readily replaceable in the power module.

DETAILED DESCRIPTION OF THE DRAWINGS

With reference to FIG. 1, the utility board 1 of this invention comprises a solid member as shown in the cutaway view, in which the solid member has a utility substrate 2 and the utility board 1, which for illustration purposes, has a decorative covering 3 on its front surface. In a marker board, for example, this surface is a surface capable of being marked upon with a felt tip pin or the like. In addition, the solid member has at least one opening 4, shown here as being in the lower edge 5 of the solid member. The utility for the solid member for purposes of this example, is that it serves as a utility board wherein various objects can be pinned or tacked to it without harming the surface of the board. With reference to FIG. 2, there is shown an end view of the solid member of FIG. 1. There is shown a tackable substrate 2, a piece of hardboard 6 as an inner layer for strength and stability, and a second solid member 7 which can be simply another piece of the tackable substrate similar to that used for the front of the utility board 1. The hardboard 6 can be any of plywood, plastic, metal, or any dense material that will lend stability to the unit. There is also shown on the front surface, a decorative covering 3 which, it will be noted covers not only the front, but also the ends 8, and the edges of the solid member.

The small rings, 9, are openings that are part of a bracket, not shown, which is used to hold the power modules 10 that are insertable in the opening and which form part of the invention herein.

With reference to FIG. 3, there is shown a front plan view of a power module 10 of this invention in which, for illustration purposes, there is shown two power receptacles 11 and an opening 17 for one of them, in a single flat member 12. The power module 10 also has two fasteners 13, which can be for example, snap expansion type fasteners which allow the power module 10 to be placed into the opening 4, and be fastened into place by joining the fasteners 13 through the retainer rings 9. Such fasteners 13 are operative such that they can be pulled out of the retainer rings 9, by twisting the fasteners to the right or to the left to disengage them from the retainer rings, and then the fasteners 13 are just simply pulled from the retainer rings 9 to release the power module 10 from the opening. It is contemplated by the inventors herein that any type of fastener can be used. In those cases where it is not desirable to show the fastener, the fasteners can be located at the backside of the utility board where there cannot be seen.

The power receptacles 11 are shown as conventional three prong electrical receptacles, but for purposes of this invention, these receptacles can be receptacles for any kind of power transmissions lines, including coaxial cable for computers, telephone lines, and the like.

The power receptacles 11 are shown in a back plan view in FIG. 4, and a side plan view 5, and with regard to these figures, there is shown a receptable housing 14, which houses the electrical contacts for the receptacle 11, and which has essentially a square configuration, and which has an outside dimension which will allow it to be snugly placed in the opening 17. The housing 14 is integrally joined at the front 15 of the housing by a retainer plate 16 which can also be viewed in FIG. 3, which retainer plate 16 has an outside perimeter size greater than the opening 17 size also shown in FIG. 3. In addition, the housing 14 contains in its walls 18, flexible latches 19, which can depend on the natural resiliency of the material they are fabricated from, or they can be spring loaded, to allow themselves to be forced back into the housing 14 so that the receptacle 11 can be fitted into the opening 17, whereupon, the latches 19 are depressed by the walls 18 of the housing 14 until the latches 19 pass by the walls 18 and then the latches 19 snap back into place and hold the receptacle 11 stable in the opening 17, by pressing against the back surface of the single flat member 12.

Portholes 20 are used as openings to wire the electrical contacts to the power source, and as shown herein, they are simply plug-in types of connections, although, it is contemplated within the scope of this invention to hard wire such receptacles.

When it is desired to remove the power receptacles 11 from the opening 17, then the latches 19 are simply depressed simultaneously, and the power receptacle 11 is removable from the opening 17 by simply pulling it straight forward. It will be recalled that receptacles that are not removable in the above manner are contemplated by the inventors herein as part of this invention.

With regard to FIG. 6, there is shown a back plan view of the power module 10 of this invention, wherein there is shown the single flat member 12. fasteners 13, opening 17, power receptacles 11, and portholes 20. Also shown is a small rail 21, which is perpendicular to the flat planar surface of the single flat member 12, the purpose of the rail 21 being to furnish a cover over the opening 4 of the solid member of the utility board and give the power module 10 stability and, to give the bottom of the utility board an aesthetic appearance.

The back surface of the single flat member 12 also provides two small retaining walls 22, which run perpendicular to the flat planar surface of the single flat member 12, and vertical to the rail 21, the purpose of the retaining walls 22 being to contact the retainer rings 9 when the power module 10 is in place and stabilize the power module 10 in the opening 4. The retaining walls 22 can also be used to attach the back cover 23 to the unit, if desired.

It should be understood by those in the art that the opening 4 of the solid member can be placed anywhere in the solid member because of the fact that it is a solid member and can support any kind of module in it.

It should be further understood by those skilled in the art that the utility board of this invention can be mounted on any vertical surface by conventional means, such as by brackets, slotted rails and hooks, and the like, and the support system for the utility board does not make up any part of this invention.

It should be further understood by those in the art that the utility board for the tackboard embodiment of this invention can be made from any solid material that will allow tacks and pins to be inserted therein without too much difficulty. Such materials useful for the utility board can be for example compressed paper, pressed board, particle board, cork, and the like. Further, the decorative cover of the board can be for example, paper, cloth, leather, cardboard, plastic laminate, for example, the dry erase marker surfaces that are commercially available, and the like, the particular design and configuration to be done according to the decor in which the board is to be used.

The utility boards of this invention can be constructed of particle board, or fiber board, by cutting the board to the desired size, cutting a second piece of board to the same pattern, cutting a piece of hardboard to the same pattern, and then gluing the pieces together with the particle or fiber board pieces on the outside, and the hardboard piece in between the particle or fiber boards. However, the laminated materials can be supplied, for example in four foot by eight foot panels from which the patterns can then be cut and this is the preferred method of manufacture. The utility boards are then covered with the desired utility material, the appropriate brackets for holding the power module are placed into the opening of the utility board, and the appropriate power module is inserted therein and locked into place to complete the construction.

It is believed by the inventors herein, that no such power module and no such utility boards are in use today, and certainly, the combination of these elements is not in use today and thus provides an economical and novel means to provide desktop power and communication service to the office.

We claim:

1. A power module in combination with a solid, portable utility board, said utility board having a front surface and a back surface and at least one such surface being a utility substrate containing at least one aligned opening therethrough, said power module comprising a single flat member having a front planar surface and a back planar surface, an upper edge, and a lower edge;

said back planar surface having on at least one of its upper edge or lower edge, a lip, directed towards the back planar surface such that a rail is formed on at least one edge of the back planar surface to adapt to, and align with a front surface outside edge of the utility board;

said power module providing at least one fastening means to fasten the power module to the utility board and, said power module providing at least one power receptacle which is readily removable from the power module, and readily replaceable in the power module;

said power module having a boxlike covering which is attached to the back planar surface and which covers the fastening means and all power receptacles of the power module.

2. A combination as claimed in claim 1 wherein the power module contains a power receptacle having a standard three-prong connection.

3. A combination as claimed in claim 1 wherein the power module contains a power receptacle having a standard telephone connection.

4. A combination as claimed in claim 1 wherein the power module contains a power receptacle having a standard computer coaxial cable connection.

5. A power module in combination with a solid, portable utility board, said utility board having a front surface and a back surface wherein at least one such surface is a utility substrate containing at least one aligned opening therethrough, said power module comprising a single flat member having a front planar surface and a back planar surface, an upper edge, and a lower edge;

said power module providing at least one fastening means to fasten the power module to the utility board and, said power module providing at least one power receptacle which is readily removable from the power module, and readily replaceable in the power module;

said power module having a boxlike covering which is attached to the back planar surface and which covers the fastening means and all power receptacles of the power module.

\* \* \* \* \*